United States Patent [19]
Kim et al.

[11] Patent Number: 5,948,544
[45] Date of Patent: Sep. 7, 1999

[54] POLYESTER MULTILAYER SHEET HAVING EXCELLENT IMPACT STRENGTH AND WEATHERABILITY, AND A PROCESS FOR PREPARING THE SAME

[75] Inventors: Kyeong Ah Kim, Yongin; Young Bum Kim, Suwon; Young Seok Kim; Yong Cheol Shin, both of Seoul; Boung Kun Son, Kyunggi-Do, all of Rep. of Korea

[73] Assignee: Kolon Industries, Inc., Kyunggi-do, Rep. of Korea

[21] Appl. No.: 09/008,829

[22] Filed: Jan. 20, 1998

[30] Foreign Application Priority Data

Jan. 20, 1997 [KR] Rep. of Korea .................. 1490/97

[51] Int. Cl.$^6$ ..................................................... B32B 27/06
[52] U.S. Cl. ............................................................ 428/480
[58] Field of Search ............................................. 428/480

[56] References Cited

U.S. PATENT DOCUMENTS

| | | | |
|---|---|---|---|
| 5,061,565 | 10/1991 | Aoki | 428/409 |
| 5,392,986 | 2/1995 | Beer | 428/35.7 |
| 5,458,965 | 10/1995 | Yoshinaka | 428/323 |
| 5,753,377 | 5/1998 | Takahashi | 428/480 |

*Primary Examiner*—Paul R. Michl
*Attorney, Agent, or Firm*—Oblon, Spivak, McClelland, Maier & Neustadt, P.C.

[57] ABSTRACT

The present invention relates to a polyester multilayer sheet having excellent impact strength and weatherability, and relates to a process for preparing the same.

The present invention relates to coextrude more than 2 kinds of copolyester resins, composed of 5–99 mol % of ethyleneterephthalate and 1–95 mol % of ethylenenaphthalate or ethyleneisophthalate, having at least 0.005 dl/g of inherent viscosity difference each others, on 3–7 layers of multilayer sheet which had been arrayed by turns with high viscosity resin and low viscosity resin, and its outer layer has the higher inherent viscosity than the inner layer.

Polyester multilayer sheet of the present invention is suitable for window glass substitute of building, transparent agricultural intercepting material and clothing material.

11 Claims, No Drawings

POLYESTER MULTILAYER SHEET HAVING EXCELLENT IMPACT STRENGTH AND WEATHERABILITY, AND A PROCESS FOR PREPARING THE SAME

BACKGROUND OF THE INVENTION

1. Field of the Invention

The present invention relates to a polyester multilayer sheet and a process for preparing the same suitable for a window glass substitute in buildings, transparent clothing material for agriculture and several other uses based on its excellent impact strength, weatherability, and transparency.

More particularly, the present invention relates to a polyester transparent multilayer sheet, having excellent impact strength and weatherability characterized being coextruded in turn with more than 3 layer of sheet using more than 2 kinds of copolyester resin which are composed of 5–99 mol % of ethyleneterephthalate and 1–95 mol % of ethylenenaphthalate or ethyleneisophthalate and have at least 0.005 dl/g of inherent viscosity difference between adjacent layers, and the higher inherent viscosity of resin is arrayed at the outer layer.

Additionally the present invention relates to a process for preparing polyester multilayer sheet having an outer layer and inner layers having excellent impact strength and weatherability, characterized by coextruding more than 2 kinds of copolyester resin, which are all composed of 5–99 mol % of ethyleneterephthalate and 1–95 mol % of ethylenenaphthalate or ethyleneisophthalate and have at least 0.005 dl/g of inherent viscosity difference between adjacent layers on more than 3 layers of multilayer sheet which have been arrayed in turn by high inherent viscosity resin and low inherent viscosity resin, wherein said outer layer of the multilayer sheet has higher inherent viscosity than the adjacent inner layer.

2. Description of Prior Art

Efforts at alternating constructional glass with transparent plastic have been unceasingly made since transparent resins such as Polystyrene, Acryl and Polycarbonate were invented. It had been anticipated that several plastic materials could replace glass in various applications such as lighting window based on their merits of lightness in weight and impact-resistance.

Such plastic material, however, is not practical as a substitute for glass due to its low weatherability. In other words, glass made of inorganic material has almost perfect weatherability, but plastic material made of organic resins are vulnerable to UV rays, has too low weatherability to secure a position as a general glass substitute entirely.

Though Acryl resin and Polycarbonate are currently routinely used instead of glass in certain applications, Acryl is weak in its impact strength, and Polycarbonate is vulnerable in its weatherablilty. Therefore, these two material can not satisfy the two most important properties of a glass substitute at the same time.

In the mean time, polyester resins represented by polyethyleneterephthalate or polyethylenenaphthalate, have lots of merits required of transparent sheet for glass substitute in that:

they have excellent mechanical properties, transparency, and durability;
they are able to form thicker than 3 mm transparent sheet, required for a glass substitute in soundproofing walls because the polyester resin can be properly delayed in its crystallization by copolymerization or blend;
they are 20–25 times the impact strength of Acryl, and 2–3 times the weatherability of Polycarbonate; and
their prices are similar or cheaper than Acryl.

Actually, some polyester resin products which are suitable for preparing various kinds of transparent sheets have been invented by researchers in several countries and are on the market. These are known as amorphous polyester.

This amorphous polyester, however, is weakened by UV rays if used outdoors for a long time due to being relatively more vulnerable to weatherability than Acryl. This phenomenon is because the polyethyleneterephthalate resin allows transention of UV rays over 320 nm.

In practice, UV stabilizer can be added in order to cover this vulnerability, however, their value as glass substitutes which requires transparency with no color, is impaired due to deteriorated color.

For these reasons, and on behalf of developing certain polyester resins having excellent weatherability and transparency, it is essential to produce certain polyester resins fundamentally able to protect against UV rays fundamentally.

On the other hand, AMOCO Technical Magazine (FA13a, 1994) suggests a method of preparing mono-layer transparent sheets comprising 2–3 times the weatherability of polyethyleneterephthalate by applying a copolymer of polyethyleneterephthalate and polyethylenenaphthalate as raw material in order to the UV protecting property of polyethylenenaphthalate. This copolyester resin could be applied to a heat-resistance container, gas-proof container, refillable/returnable container, medicine container and UV protecting container based on its excellent heat-resistance, protecting property of oxygen, carbon dioxide, vapor and UV, chemical-resistance and hydrolysis-resistance.

Since the price of polyethylenenaphthalate itself is fairly expensive, economic efficiency, despite of the improved UV protecting property, shall be deteriorated if polyethylenenaphthalate is used too much. Meanwhile, if polyethylenenaphthalate is used too little, the resin looses its UV protecting property and is weakened by UV light.

Accordingly, the purpose of present invention is to provide polyester multilayer sheet suitable as a window glass substitute in buildings or houses based on its excellent impact strength, weatherability, and transparency with cheap production cost.

SUMMARY OF THE INVENTION

The present invention relates to a polyester multilayer sheet and a process for preparing the same suitable as a window glass substitute in buildings, transparent clothing materials for agriculture and several other uses based on its excellent impact strength, weatherability, and transparency.

More particularly, the present invention relates to a polyester transparent multilayer sheet characterized by being coextruded in turn with more than 3 layers of sheets comprising more than 2 kinds of copolyester resin which are composed of 5–99 mol % of ethyleneterephthalate and 1–95 mol % of ethylenenaphthalate or ethyleneisophthalate and having at least 0.005 dl/g of inherent viscosity difference among them and having higher inherent viscosity in the outer layer than the adjacent inner layer.

Additionally the present invention relates to a process for preparing polyester multilayer sheet having excellent impact strength and weatherability, characterized by coextruding more than 2 kinds of copolyester resin which are composed of 5–99 mol % of ethyleneterephthalate and 1–95 mol % of ethylenenaphthalate or ethyleneisophthalate and having at least 0.005 dl/g of inherent viscosity difference among them on more than 3 layers of multilayer sheet which have been arrayed in turn by high inherent viscosity resin and low inherent viscosity resin, wherein the outer layer has a higher inherent viscosity than the inner layer.

DESCRIPTION OF THE PREFERRED EMBODIMENT

Raw material polyester resins used in the present invention are more than 2 kinds of copolyester resin, which have been delayed in their crystallization speeds in order that transparent sheet is more than 2 mm thick may be prepared in calender for preparing transparent sheet. In preparing this copolyester resin, dimethylterephthalate or terephthalic acid with ethylene glycol are used as major components, and dimethyl-2,6-naphthalenedicarboxylate, dimethylisophthalate or isophthalic acid with ethylene glycol are used as copolymerization components.

Copolyester resin is composed of 5–99 mol % of ethyleneterephthalate (more preferably 85–99 mol %) and 1–95 mol % of ethylenenaphthalate or ethyleneisophthalate (more preferably 1–15 mol %), its favorable inherent viscosity is 0.70–0.90 dl/g.

Differences in inherent viscosity between copolyester resins applied in the present invention is at least 0.005 dl/g or above in order to coextrude on multilayer sheet through a coextruder.

If the differences in inherent viscosity between copolymerized polyester resins are below 0.005 dl/g, it is not possible to prepare multilayer sheet due to mixing of the resins during coextrusion through the coextruder.

Constitution ingredients and copolymerization ratios of each of the sheets which compose the multilayer sheet of the present invention shall not be of much importance whether the same or different.

one can prepare polyester multilayer sheet of the present invention by coextruding the above illustrated more than 2 kinds of copolyester resins on more than 3 layers of multilayer sheet which have been arrayed by high viscosity resin and low viscosity resin mutually through a coextruder.

The polyester multilayer sheet of the present invention has remarkably improved UV protecting property and impact strength than monolayer polyester sheet, while its transparency does not decrease.

Detailed illustration of the present invention follows.

Prepare copolymer, having anticipated the viscosity by performing the next serial steps:

On the whole repeating unit of copolymerized polyester resin, pour 5–99 mol % of dimethylterephthalate (more preferably 85–99mol %), 1–95 mol % of dimethyl-2, 6-naphthalene dicarboxylate, dimethylisophthalate or isophthal acid (more preferably 1–15 mol %), and 150–250 mol % of ethylene glycol into a reactor;

Obtain some low molcular weight copolymer by a transesterification reaction under certain catalyzers such as Zinc, Manganese, Cobalt, Magnesium, or Calcium; and By depressurizing below 1 Torr, perform a polymerization reaction at 270–300° C. by applying a polymerization catalyst such as Antimony, and Germanium.

With the above copolymer, polymerize again for 10–30 hours at 210–230° C., in less than 1 Torr vacuum status, to prepare more than 2 kinds of copolymer having inherent viscosities of 0.75–0.90 dl/g, the differences in inherent viscosity between 2 kinds of copolymer being over 0.005 dl/g.

After drying the prepared copolymer below 50 ppm moisture at 160° C., prepare 2–10 mm thick multilayer sheet by arraying the more than 2 kinds of copolymers in turn using a coextruder which can make multilayer sheet.

During coextrusion array the higher inherent viscosity polyester resin at the outer layer. As for the layers arrayed from top to bottom, array the high viscosity resin and the low viscosity resin by turns. And then prepare multilayer sheet which has different inherent viscosities and refractive indexes in each layer.

Favorable layers of polyester multilayer sheet in the present invention shall be 3–7 layers, but it would not matter much if the multilayer sheet is composed of more than 7 layers.

Favorable thickness of polyester multilayer sheet in the present invention shall be 2–10 mm, but the thick shall not be specially restricted.

Polyester multilayer sheet of the present invention is a multilayer sheet arrayed in turn with more than 2 kinds of copolyester resin, the difference in inherent viscosity between 2 kinds of copolyester resin is over 0.005 dl/g, and has different inherent viscosities and refractive indexes in each layer.

Different composition ratios and/or different inherent viscosities are the reasons why the refractive indexes are different in each layer.

If the thickness of the polyester multilayer sheet in the present invention is 3 mm, its visible light transmittance is over than 85%, and its weatheability is so excellent as to protect more than 85% of UV light which of 365 Nanometer wavelength or less.

As the polyester multilayer sheet of the present invention is composed of mutually arrayed layers having different inherent viscosities and refractive indexes, incoming light to the inside of sheet in each layer shall be reflected partially at the interface of the each layer. As the reflected light at this case is usually certain UV lights which have short wavelength, UV transmittance shall be remarkably lowered. Consequently, the weatherability of polyester multilayer sheet of the present invention shall be increased. This effect of protecting against UV light is in direct proportion to the number of layers in the multilayer sheet and also to the difference between inherent viscosities in the copolyester resins in each layer.

In addition, it is possible to prepare multilayer sheet by coextruding more than 2 kinds of resins having different inherent viscosities not only by using different kinds of resins but also by using the same kinds of resin having different inherent or melt viscosities during extrusion. The larger the difference in melting viscosities between copolyester resins, the easier forming of multilayer sheet without mixing at the inside of the melt line or the die of the coextruder. And as for a sheet coextruded with different resins having different mechanical strength by turns, impact strength shall be obviously improved due to the same effect as the reinforcing effect in composite materials involving matrix resin and fibers.

The present invention will be discussed more particularly through the following examples and comparative examples. The present invention however, is not limited only to these examples:

EXAMPLE 1

PREPARING COPOLYMER

Prepare copolymer(X), its inherent viscosity is 0.65 dl/g, by performing next 3 steps;

pour 1 mol % of Dimethyl-2,6-naphthalenedicarboxylate (NDC), 99 mol % of Dimethylterephthalate(DMT), and 200 mol % of Ethylene glycol(EG) into reactor;

remove more than 98% of the theoretical amount of methanol produced during a transesterification reaction at 230° C. in the presence of 400 ppm of Manganese Acetate, and polymerize under pressure below 1 Torr at 280° C. after adding 300 ppm of Antimony Oxide and 400 ppm Phosphorides thermal stabilizer.

Then prepare the low viscosity copolyester resin (hereinafter called "resin A"), its inherent viscosity is 0.70 dl/g, by solid state polymerization of the prepared copolymer(X) for 5 hours at 180° C. In the mean time, prepare the high viscosity copolyester resin (hereinafter called "resin B"), its inherent viscosity is 0.75 dl/g, by solid state polymerization of the prepared copolymer(X) for 14 hours at 220° C. under vacuum.

PREPARING SHEET

After drying the prepared "resin A" and "resin B" to a moisture content less than 50 ppm at 160° C., produce a multilayer sheet by coextruding "resin A" and "resin B" through a T-Die(width=110 cm) of a coextruder.

The multilayer sheet is 3 layers, and the thickness is 3 mm. In totally, "resin A" and "resin B" are arrayed by turns in each layer of the multilayer sheet. The outer layer of the sheet is composed of "resin B". The bottom and intermediate layers of the sheet are each composed of one resin selected from "resin A" and "resin B". Evaluations of weatherability, transparency, UV light transmittance and impact strength of the produced polyester multilayer sheets are shown in Table 2.

EXAMPLE 2–EXAMPLE 3 AND COMPARATIVE EXAMPLE 1

Prepare polyester multilayer sheets using the same method as EXAMPLE 1, except changing the preparation conditions of the copolymer and sheet as shown in Table 1.

Evaluation results for the produced polyester multilayer sheet are shown in Table 2.

TABLE 1

Preparation of Polyester Multilayer Sheet

|  |  | Example 1 | Example 2 | Example 3 | Comparative Example 1 |
|---|---|---|---|---|---|
| Composition | NDC | 1.0 | 3.0 | 5.0 | 8.0 |
| Ratio of | DMT | 99.0 | 97.0 | 95.0 | 92.0 |
| Copolymer (mole %) | EG | 200 | 200 | 200 | 200 |
| Inherent Viscosity (dl/g) | Resin A | 0.70 | 0.70 | 0.70 | 0.70 |
|  | Resin B | 0.75 | 0.80 | 0.77 | 0.86 |
| Types of resin used in preparing the sheet |  | resin A and resin B (2 types) | resin A and resin B (2 types) | resin A and resin B (2 types) | resin B (1 types) |
| Thickness of Sheet (mm) |  | 3 | 3 | 3 | 3 |
| Layers of Sheet |  | 3 | 5 | 7 | 1 |

Inherent viscosity in Table 1 is measured with ubelohde type capillary viscometer at 30° C. after dissolved 0.2 g of resin at 100° C. in 25 ml of mixture of Phenol/Tetrachloroethane(weight ratio 6/4).

TABLE 2

Properties of Polyester Multilayer Sheet

|  | Example 1 | Example 2 | Example 3 | Comparative Example 1 |
|---|---|---|---|---|
| Protection Ratio of UV lights below than 365 nm (%) | 87 | 90 | 98 | 90 |
| Weatherability | about 720 hrs | about 750 hrs | about 800 hrs | about 600 hrs |
| Visible Lights Transmittance (%) | 88 | 87 | 85 | 89 |

TABLE 2-continued

Properties of Polyester Multilayer Sheet

|  | Example 1 | Example 2 | Example 3 | Comparative Example 1 |
|---|---|---|---|---|
| Improvement of Impact Strength. | 1.47 | 1.55 | 1.64 | 1.0 |

Improvement of impact strength in Table 2 is the relative value of impact strength to that of comparative example 1 (1.0) after measuring each value by using A FALLING DART TYPE IMPACT TESTER, Model 8250 of Dynatup Co.

Protection Ratio of UV light is measured with UV—VISIBLE SPECTRA by using a HP8452A UV-VIS SPECTROPHOTOMETER.

Weatherability is evaluated, as ASTM G 26-90, by the change of impact strength depending on exposure time under UV light in a weather-o-meter by using INSTRON TENSILE STRENGTH TESTER.

The polyester multilayer sheet of the present invention is a multilayer sheet arrayed by turns with copolymerized polyester resins comprising 2 kinds of inherent viscosity and refractive index, suitable for window glass substituted in buildings, and transparent clothing material for the agricultural field, based on its excellent impact strength, weatherability, and transparency with cheap production cost.

What is claimed is:

1. A transparent polyester multilayer sheet, having excellent impact strength and weatherability, obtained by a process comprising:

coextruding more than 3 layers of sheets using at least two separate kinds of copolyester resin which are composed of 5–99 mol % of ethyleneterephthalate and 1–95 mol % of ethylenenaphthalate or ethyleneisophthalate and have at least 0.05 dl/g difference in inherent viscosity between adjacent layers, wherein an outer layer has higher inherent viscosity than the adjacent inner layer.

2. The polyester multilayer sheet of claim 1, wherein the constitution ingredients and copolymerization ratios of the resins which compose each layer are the same.

3. The polyester multilayer sheet of claim 1, wherein the constitution ingredients and copolymerization ratios of the resins which compose each layer are different.

4. The polyester multilayer sheet of claim 1, wherein the copolymerized polyester resins are composed of 85–99 mol % ethyleneterephthalate and 1–15 mol % ethylenenaphthalate or ethyleneisophthalate.

5. The polyester multilayer sheet of claim 1, wherein the thickness of said polyester multilayer sheet is 2–10 mm.

6. The polyester multilayer sheet of claim 1, wherein the polyester multilayer sheet is composed of 3–7 layers.

7. The polyester multilayer sheet of claim 1, which has a thickness of 3 mm, its visible light transmittance is over 85%, and its protection ratio of UV light of wavelength less than 365 nanometers is over 85%.

8. A process for preparing transparent polyester multilayer sheet having excellent impact strength and weatherability, comprising:

coextruding more than two separate kinds of copolyester resins, composed of 5–99 mol % of ethyleneterephthalate and 1–95 mol % of ethylenenaphthalate or ethyleneisophthalate, and having at least 0.005 dl/g difference in inherent viscosity between adjacent layers of the multilayer sheet, said coextruded layers being arrayed in turn by high inherent viscosity resin and low inherent viscosity resin, wherein an outer layer has higher inherent viscosity than the adjacent inner layer.

9. The process for preparing polyester multilayer sheet of claim 8, wherein the constitution ingredients and copolymerization ratios of the resins which compose each layer are the same.

10. The process for preparing polyester multilayer sheet of claim 8, wherein the constitution ingredients and copolymerization ratios of resins which compose each layer are different.

11. The process for preparing polyester multilayer sheet of claim 8, wherein the copolyester resins are composed of 85–99 mol % of etheleneterephthalate and 1–15 mol % of ethylenenaphthalate or ethyleneisophthalate.

* * * * *